J. A. JONES.

Drill-Points for Seed-Drills.

No. 9,165. Reissued April 20, 1880.

Witnesses:

A. P. Grant,

H. F. Keicher

Inventor:

John A. Jones, by John A. Wiedenhaum

ATTORNEY.

N. PETERS, PHOTO-LITHOGRAPHER, WASHINGTON, D. C.

UNITED STATES PATENT OFFICE.

JOHN A. JONES, OF MOUNT PLEASANT, DELAWARE.

DRILL-POINT FOR SEED-DRILLS.

SPECIFICATION forming part of Reissued Letters Patent No. 9,165, dated April 20, 1880.

Original No. 216,189, dated June 3, 1879. Application for reissue filed February 5, 1880.

*To all whom it may concern:*

Be it known that I, JOHN A. JONES, a citizen of the United States, residing at Mount Pleasant, in the county of New Castle and State of Delaware, have invented a new and useful Improvement in Drill-Points for Seed-Drills, which improvement is fully set forth in the following specification and accompanying drawings, in which—

Figure 1:
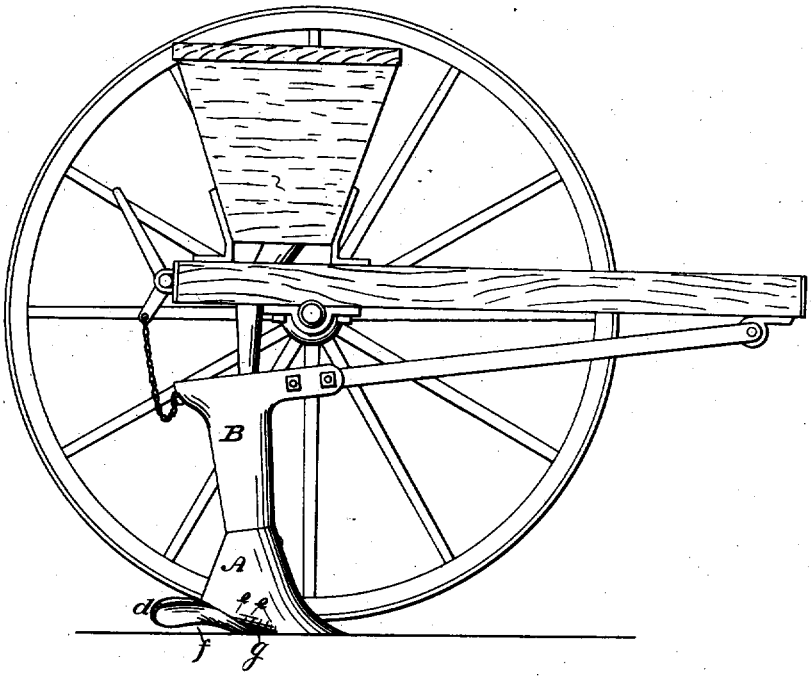
Figure 2:
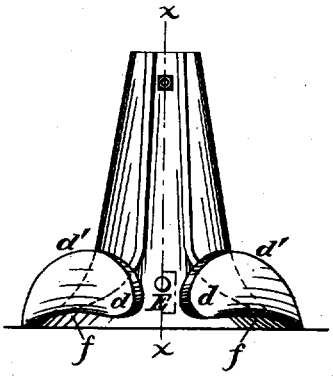
Figure 3:
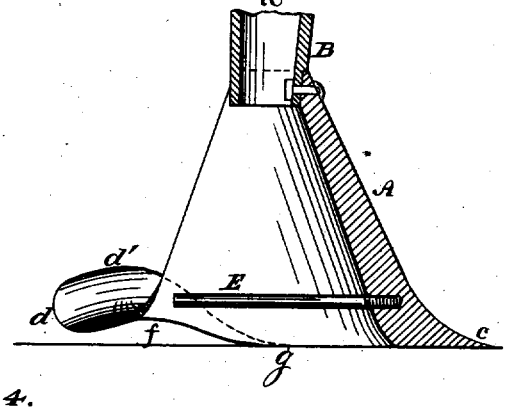
Figure 4:
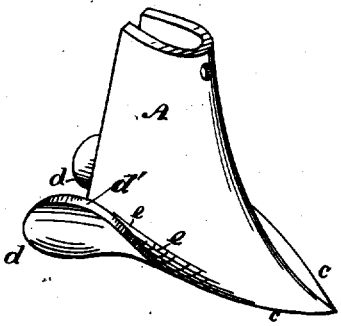

Figure 1 is a side elevation of a grain-drill having my invention applied to it. Fig. 2 is a rear view of the boot-point detached and enlarged. Fig. 3 is a vertical section thereof in line *x x*, Fig. 2. Fig. 4 is a perspective view of the point.

Similar letters of reference indicate corresponding parts in the several figures.

My invention relates to improvements in that class of drill-boot points which are adapted to form wide shallow furrows for the reception of seed, wheat, and similar grain; and its object is to form a wide furrow having a perfectly flat bottom upon which the seed will lie as it falls from a spreader, and will not roll to the center; to so form the rear portion of the point that it will effectively cover and not disturb or crowd the seed inward toward the center of the furrow, and not catch grass, clods, and other obstructions and filth, and to provide for the covering of the seed, as it is spread, with moist mellow soil instead of with dry surface-earth.

The invention consists of a drill-boot point having a mold-board constructed to cover the seed without disturbing it or sweeping it to the center of the furrow, and, furthermore, consists in constructing said mold-board so that it will not catch grass, clods, and other obstructions.

Referring to the drawings, A represents the drill-boot point, and B the drill-boot. At the bottom of the point A is a lip or flange, *c*, which diverges on each side from the front edge to a point, *g*, near the rear, and then converges, as at *e*, and is extended rearward of the point obliquely inward and downward, as at *d*, to the termination, the portions *d* being somewhat broader than the flanges *c* and forming a mold-board. The earth is turned up by the point, and then directed inward by the converging portions *e e* and the oblique portions *d*, and a portion of it thus turned inward behind the point upon the furrow formed by the point, so as to cover the seed which has been spread upon the bottom of the furrow by the spreader E, consisting of a bar extending rearwardly through the point from its front and lying in the path of the seed as it drops from the boot, so that as the stream of falling seed strikes the spreader it is divided, and portions are deflected toward opposite sides of the furrow.

The bottoms of the converging portions *e* and extensions *d* are inclined or raised from the level of the bottom surface of the forward portion of the point in order to leave a space on each side for clearing the seed which has been spread in the furrow, thus avoiding dragging or crowding of the seed toward the center of the furrow. Furthermore, the outer edges, *d'*, of the portions *d* set low down and back of the point *g*, and possess but slight elevation, so that they are not materially salient, and therefore prevented from catching grass, clods, and other obstructions.

Covering devices heretofore used in drills have simply scraped the surface earth over the seed, and this surface earth being usually dry at the time of seeding, a proper germination of the seed was not obtained; but by my point it will be seen that the fresh earth turned up by the point is caught by the oblique portions *d* of the lip or flange and thrown inwardly, covering the seed evenly with moist mellow soil, so that it is planted under conditions most favorable for its germination and subsequent growth.

Having thus described my invention, what I claim as new, and desire to secure by Letters Patent, is—

1. A drill-boot point provided with a bottom flange, *c*, diverging from the front edge of the point on each side thereof to the point *g*, near the rear of said point, then converging, as at *e e*, and extended rearward of the point obliquely inward and downward, as at *d*, whereby the seed in the furrow will be effectively covered with fresh earth turned up by the point, and the edges *d'* of the extended portions *d*, being set low, are prevented from catching grass, clods, &c., substantially as and for the purpose set forth.

2. A drill-boot point provided with a bottom diverging flange, *c*, converging portions *e e*, and oblique inward and downward rear portions, *d*, the bottoms of said portions *d e* being elevated above the level of the bottom surface of the forward portion of the point and flange, whereby said portions *d e* are prevented from dragging or disturbing the seed in the furrow while serving to cover the seed with earth turned up by the point, substantially as and for the purpose set forth.

JOHN A. JONES.

Witnesses:
JOHN A. REYNOLDS,
R. A. COCHRAN, Jr.